(12) United States Patent
Doi et al.

(10) Patent No.: US 6,190,455 B1
(45) Date of Patent: Feb. 20, 2001

(54) FINELY-DIVIDED POWDER SPRAY APPARATUS

(75) Inventors: Shin Doi; Masaki Ban, both of Saitama-ken (JP)

(73) Assignees: Nisshin Flour Milling Co., Ltd.; Nisshin Engineering Co., Ltd., both of Tokyo (JP)

( * ) Notice: Under 35 U.S.C. 154(b), the term of this patent shall be extended for 0 days.

(21) Appl. No.: 09/238,059

(22) Filed: Jan. 27, 1999

(30) Foreign Application Priority Data

Jan. 27, 1998 (JP) .................................................. 10-013827
Jun. 24, 1998 (JP) .................................................. 10-177005

(51) Int. Cl.$^7$ ............................... B05B 3/00; B05C 19/00
(52) U.S. Cl. ........................... 118/308; 118/323; 118/309
(58) Field of Search ..................................... 118/305, 308, 118/309, 621, 624, 627, 640, 323

(56) References Cited

U.S. PATENT DOCUMENTS

| 3,703,880 | * | 11/1972 | Wampler | 118/2 |
| 4,724,154 | * | 2/1988 | Consentino et al. | 427/27 |
| 5,660,633 | * | 8/1997 | Murata et al. | 118/308 |
| 5,814,368 | * | 9/1998 | Yamada et al. | 427/180 |

* cited by examiner

*Primary Examiner*—Shrive Beck
*Assistant Examiner*—Jennifer Calcagni
(74) *Attorney, Agent, or Firm*—Young & Thompson

(57) ABSTRACT

A finely-divided powder spray apparatus of the invention comprises a spray nozzle pipe disposed at a position spaced apart from a member to be sprayed a prescribed interval; a support unit of the spray nozzle pipe for supporting it so that it can be inclined; a first joint unit disposed to the upper end of the spray nozzle pipe; two linearly-moving actuators that each move in respective linear paths that are fixed relative to each other and each provided with a second joint unit; and two rods for coupling each of the second joint units with the first joint unit; wherein the finely-divided powder is sprayed onto the member to be sprayed from the spray nozzle pipe which is inclined in an arbitrary direction by combining the movements of the two linearly-moving actuators. This spray apparatus is a smaller apparatus capable of spraying the finely-divided powder such as liquid crystal spacers onto a larger member to be sprayed such as a larger glass substrate and does not uselessly spray finely-divided powder to the periphery of a member to be sprayed by providing a drive mechanism for driving a spray nozzle pipe which has a larger spray angle, can move in a prescribed direction at a high speed, applies a uniform load on drive sources for driving the spray nozzle pipe and can change the center of the locus of a spray path along which the finely-divided powder is sprayed and the moving speed of the center of the locus.

12 Claims, 15 Drawing Sheets

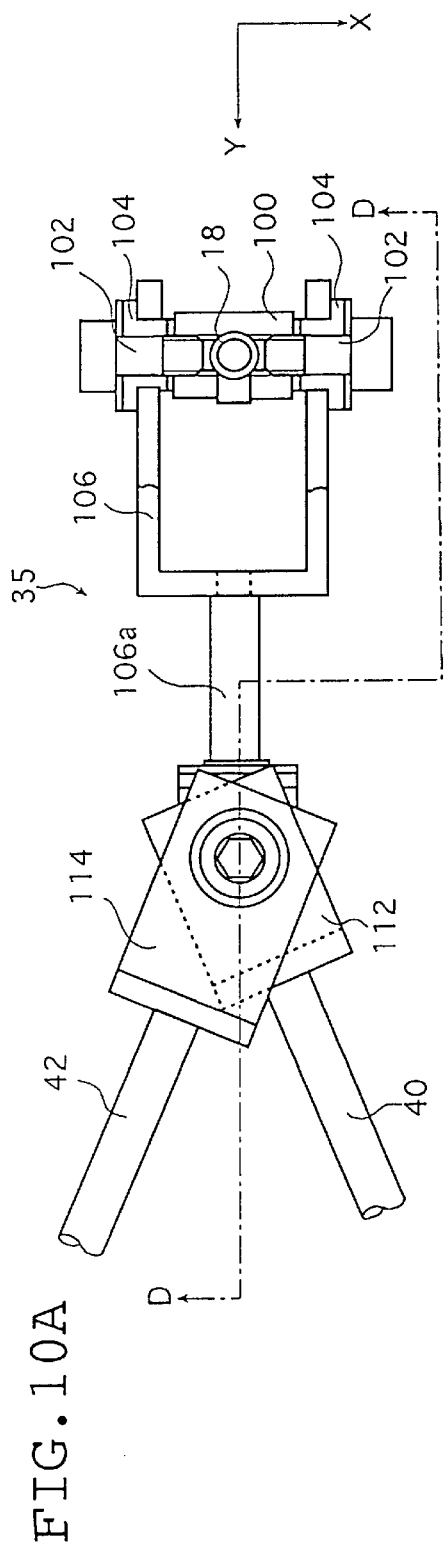
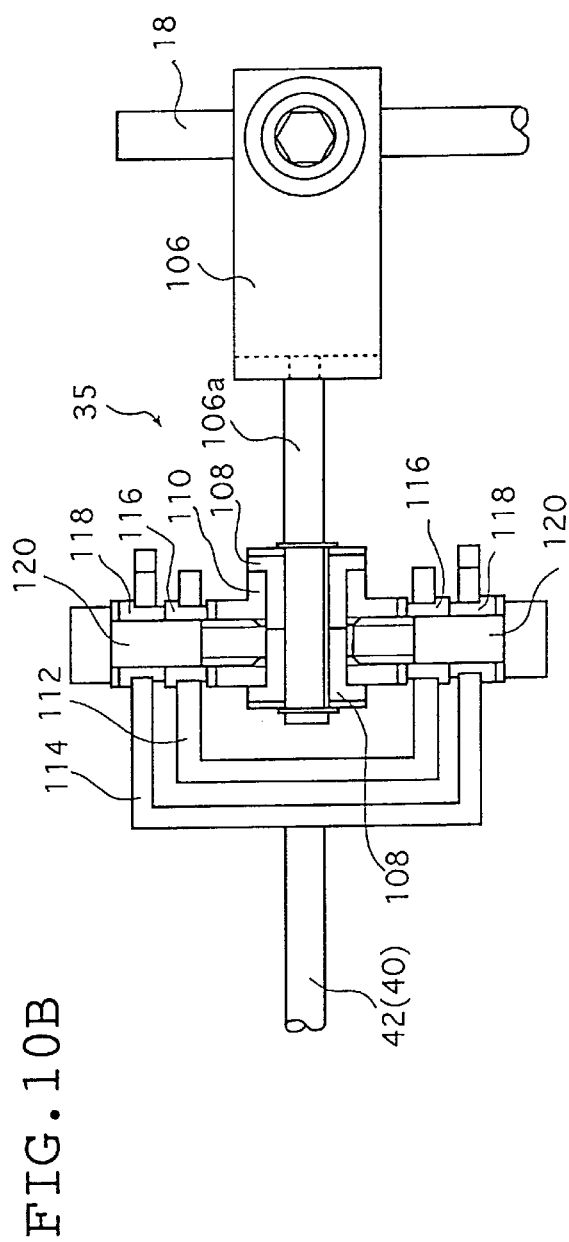
FIG.10A
FIG.10B

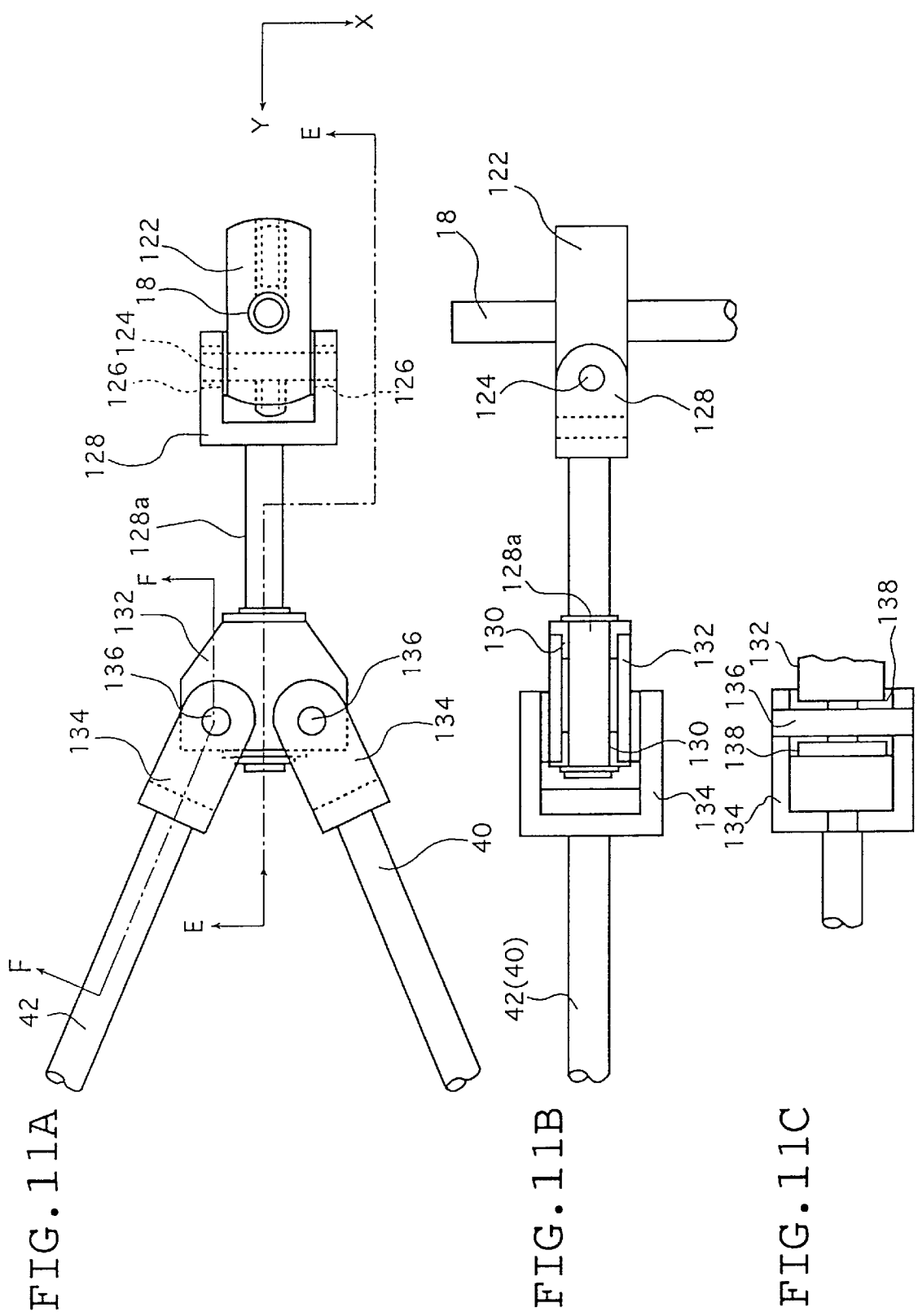

FINELY-DIVIDED POWDER SPRAY APPARATUS

BACKGROUND OF THE INVENTION

The present invention belongs to the technical field of a finely-divided powder spray apparatus for discharging finely-divided powder together with a gas stream from an inclined spray nozzle pipe and spraying the finely-divided powder onto a member to be sprayed such as a substrate and the like.

There is known a liquid crystal spacer spray apparatus as a representative example of the finely-divided powder spray apparatus, the apparatus uniformly spraying liquid crystal spacers (spacer beads) as finely-divided powder having a uniform particle size between liquid crystal substrates constituting a liquid crystal display panel used to a liquid crystal display device and the like, for example, between a glass sheet and a glass sheet or a plastic substrate in a prescribed amount so that the liquid crystal spacers are formed to a single layer.

In the liquid crystal display panel of the liquid crystal display device and the like, particles (spacer beads) having a uniform particle size of about several microns to several tens of microns are sprayed or coated as spacers as uniformly as possible in an amount of 10 to 2000 particles in a unit area of 1 mm$^2$ in order to form a space into which liquid crystal is charged between a glass sheet serving as a liquid crystal substrate and a glass sheet or a plastic (organic glass, etc.) substrate other than the glass sheet or between a plastic substrate and a glass substrate (hereinafter, the glass substrate will be described as a representative example and the above members are referred to as glass substrates as a whole). Various types of plastic particles and silica particles are used as the liquid crystal spacers.

There have been known liquid crystal spacer spray apparatuses as an apparatus for uniformly spraying a prescribed amount of the liquid crystal spacers onto the glass sheet serving as the liquid crystal substrate in a single layer.

As the liquid crystal spacer spray apparatus, there have been used spray apparatuses for uniformly spraying the liquid crystal spacers onto the glass substrate by suspending the liquid crystal spacers in a liquid of chlorofluorocarbon, etc. in a colloid state, uniformly spraying the spacers onto the glass sheet in a liquid state and vaporizing the liquid of chlorofluorocarbon, etc. However, these spray apparatuses using chlorofluorocarbon, etc. cannot be used because the use of chlorofluorocarbon, etc is restricted or prohibited due to the problem of environmental pollution.

To cope with the above circumstances, there have been proposed liquid crystal spacer spray apparatuses using a gas such as air, a nitrogen gas, etc. in place of chlorofluorocarbon. These liquid crystal spacer spray apparatuses transport fine liquid crystal spacer particles (spacer beards) together with a gas flow of the air, the nitrogen gas, etc. through a thin pipe (transportation pipe) and discharge the particles form a swinging spray nozzle pipe together with the gas flow so that they are sprayed onto the glass substrate.

However, since the liquid crystal spacer particles are composed of finely-divided powder having a particle size of several microns to several tens of microns, they are liable to float. Further, since the liquid crystal spacer particles are composed of various types of plastic particles or silica particles, they are liable to be charged and it is difficult to spray them onto the glass substrate at a prescribed density with excellent reproducibility. Therefore, the liquid crystal spacer particles are charged in accordance with a charged polarity (electrostatic polarity) as well as the glass substrate and a table are grounded to permit the liquid crystal spacer particles to be reliably sprayed onto the glass substrate in the prescribed density.

In the liquid crystal spacer spray apparatus, the spray nozzle pipe which performs a swing motion to discharge the liquid crystal spacer particles together with the gas flow is conventionally arranged such that it is swung in an X-axis direction and a Y-axis direction, respectively by a crank or an eccentric cam coupled with a motor and the inclinations of the spray nozzle pipe in the X-axis direction and the Y-axis direction are combined so that the spray nozzle pipe sprays the liquid crystal spacer particles onto the glass substrate as shown in FIG. 8A.

In the conventional liquid crystal spacer spray apparatus, the spray nozzle pipe reciprocates once in the Y-axis direction while it reciprocates a plurality of times (6 times in the illustrated example) in the X-axis direction as apparent from FIG. 8A which shows an example of the center locus of a path along which the liquid crystal spacers are to be sprayed onto the glass substrate.

The spray nozzle pipe is swung in such an arrangement that it is supported by a spherical bearing at the center thereof and driven by a crank or an eccentric cam at the upper portion thereof.

Recently, since the size of a liquid crystal display panel is increased gradually as well as a plurality of liquid crystal display panels are often made from a single glass substrate, it is required to spray the liquid crystal spacers to a wider area. To cope with the requirement, there is a tendency that a swing angle required to the spray nozzle pipe for spraying the liquid crystal spacers is increased.

To spray the liquid crystal spacers onto a large glass substrate, it is necessary to increase the size of the table on which the glass substrate is mounted and the height of a chamber, or to increase the swing angle of the spray nozzle pipe. When, however, the swing angle of the spray nozzle pipe of the conventional liquid crystal spacer spray apparatus is increased, the swing speed of the spray nozzle pipe is limited by the speed thereof in the X-axis direction because the spray nozzle pipe is swung at a very high speed in the X-axis direction as compared with the swing speed thereof in the Y-axis direction as well as the durability of the spray nozzle pipe in the X-axis direction is apparently different from the durability thereof in the Y-axis direction.

Whereas, when the size of the table of the glass substrate and the height of the chamber are increased to spray the liquid crystal spacers onto the large glass substrate, the size of the spray apparatus itself can be also increased. However, since the height of the ceiling of a clean room in which the liquid crystal spacers are sprayed is limited, the clean room must be specially designed to increase the height of the ceiling thereof. Thus, there is arisen a problem that the cost of the clean room is increased. In particular, when the size of the glass substrate is further increased hereinafter and a glass substrate of about 1000 mm×1000 mm is made, there is problem that a conventional spray system cannot be accommodated in a currently used clean room.

Since the spray nozzle pipe is swung by the crank or the eccentric cam, the spray nozzle pipe does not move at a constant speed and the moving speed of it greatly varies at both the ends thereof. Therefore, the spray nozzle pipe must spray the liquid crystal spacers to an area which is sufficiently larger than a glass substrate 16, by which a useless space is required to the periphery of the glass substrate as shown in FIG. 8.

Further, since the spray nozzle pipe is swung by the crank or the eccentric cam, the center of the locus of a spray path along which the liquid crystal spacers are sprayed onto the glass substrate is located on a prescribed moving path and moves at a prescribed moving speed. Accordingly, since it is difficult to partly change the moving path and the moving speed, even if the liquid crystal spacers are partly irregularly sprayed, the spray of them cannot be corrected.

SUMMARY OF THE INVENTION

An object of the present invention is to provide a finely-divided powder spray apparatus which does not uselessly spray finely-divided powder to the periphery of a member to be sprayed even if the member has a larger size by providing a drive mechanism for driving a spray nozzle pipe which has a larger spray angle, can move in a prescribed direction, for example, in an X-axis direction at a high speed, applies a uniform load on drive sources for driving the spray nozzle pipe and can change the center of the locus of a spray path along which the finely-divided powder is sprayed and the moving speed of the center of the locus so as to solve the problems of the prior art and spray the finely-divided powder such as liquid crystal spacers and the like onto a larger member to be sprayed such as a larger glass substrate and the like.

Another object of the present invention is to provide a small finely-divided powder spray apparatus having a lower height which can be installed in an existing room, for example, in an existing clean room by reducing the height of a spray chamber even if the finely-divided powder is sprayed onto the larger member to be sprayed, does not require to increase the height of a ceiling by a special design and accordingly does not increase a cost, in addition to the above object.

To achieve the above objects, there is provided according to a first aspect of the present invention a finely-divided powder spray apparatus which comprises a spray nozzle pipe disposed at a position spaced apart from a member to be sprayed a prescribed interval for discharging finely-divided powder from the extreme end thereof onto the member to be sprayed together with a gas stream in the state that it is inclined in a prescribed direction with respect to the member to be sprayed; a support unit of the spray nozzle pipe for supporting it so that it can be inclined in a prescribed first direction and a second direction perpendicular to the first direction; a first joint unit disposed to the upper end of the spray nozzle pipe; two linearly-moving actuators disposed side by side in parallel with the second direction or by being inclined a prescribed angle with respect to the second direction and each provided with a second joint unit; and two rods for coupling each of the second joint units disposed to the two linearly-moving actuators with the first joint unit disposed to the spray nozzle pipe, wherein the finely-divided powder is sprayed onto the member to be sprayed from the spray nozzle pipe which is inclined in an arbitrary direction by combining the movements of the two linearly-moving actuators.

It is preferable here that the support unit includes two adjustable joints which are composed of an adjustable joint for supporting the spray nozzle pipe so that it can be inclined in the first direction and an adjustable joint for supporting the spray nozzle pipe so that it can be inclined in the second direction.

According to a second aspect of the present invention, there is provided a finely-divided powder spray apparatus including a base table on which a substrate is positioned and fixed and a spray nozzle pipe disposed to the base table at a position spaced apart from the base table a prescribed interval for discharging finely-divided powder together with a gas stream in the state that it is inclined in a prescribed direction to thereby spray the finely-divided powder to a prescribed position on the substrate, the spray apparatus comprising the spray nozzle pipe capable of being inclined in any of a first direction and a second direction perpendicular to the first direction; a first joint unit disposed to the upper end of the spray nozzle pipe; two linearly-moving actuators disposed side by side in parallel with the second direction or by being inclined a prescribed angle with respect to the second direction and each provided with a second joint unit; and two rods for coupling the first joint unit of the spray nozzle pipe with the second joint units of the two linearly-moving actuators, respectively, wherein the finely-divided powder is sprayed onto the substrate by inclining the spray nozzle pipe in the first direction and the second direction by combining the movements of the two linearly-moving actuators.

It is preferable here that the spray nozzle pipe is supported by two adjustable joints so that it can be inclined in the first and second directions and the two adjustable joints are composed of an adjustable joint for supporting the spray nozzle pipe so that it can be inclined in the first direction and an adjustable joint for supporting the spray nozzle pipe so that it can be inclined in the second direction.

In the respective aspects, it is preferable that the first joint unit of the spray nozzle pipe includes two adjustable joints which are coupled with the two rods, respectively.

It is preferable that the spray nozzle pipe is moved in the first direction by the movement of the two linearly-moving actuators in an opposite direction and moved in the second direction by the movement of the two linearly-moving actuators in the same direction.

It is preferable that the two linearly-moving actuators are numerically controlled so that they can be moved independently of each other and the spray nozzle pipe can be moved in an arbitrary direction at an arbitrary speed by combining the moving directions and the moving speeds of the two linearly-moving actuators.

Further, it is preferable that the substrate is composed of a liquid crystal substrate and the finely-divided powder is composed of liquid crystal spacers.

BRIEF DESCRIPTION OF THE DRAWINGS

FIG. 10A is a plan view, partly in cross section, showing a second embodiment of the swing mechanism of the finely-divided powder spray apparatus of the present invention and FIG. 10B is a front elevational view of the second embodiment of the swing mechanism partly in cross section taken along the line D—D of FIG. 10A;

FIG. 11A is a plan view showing a third embodiment of the swing mechanism of the finely-divided powder spray apparatus of the present invention, FIG. 11B is a front elevational view of the third embodiment of the swing mechanism partly in cross section taken along the line E—E of FIG. 11A, and FIG. 11C is a sectional view of the third embodiment of the swing mechanism taken along the line F—F of FIG. 11A;

DETAILED DESCRIPTION OF THE INVENTION

A finely-divided powder spray apparatus of the present invention will be described below in detail based on the preferable embodiments shown in the accompanying drawings.

Figure 1:
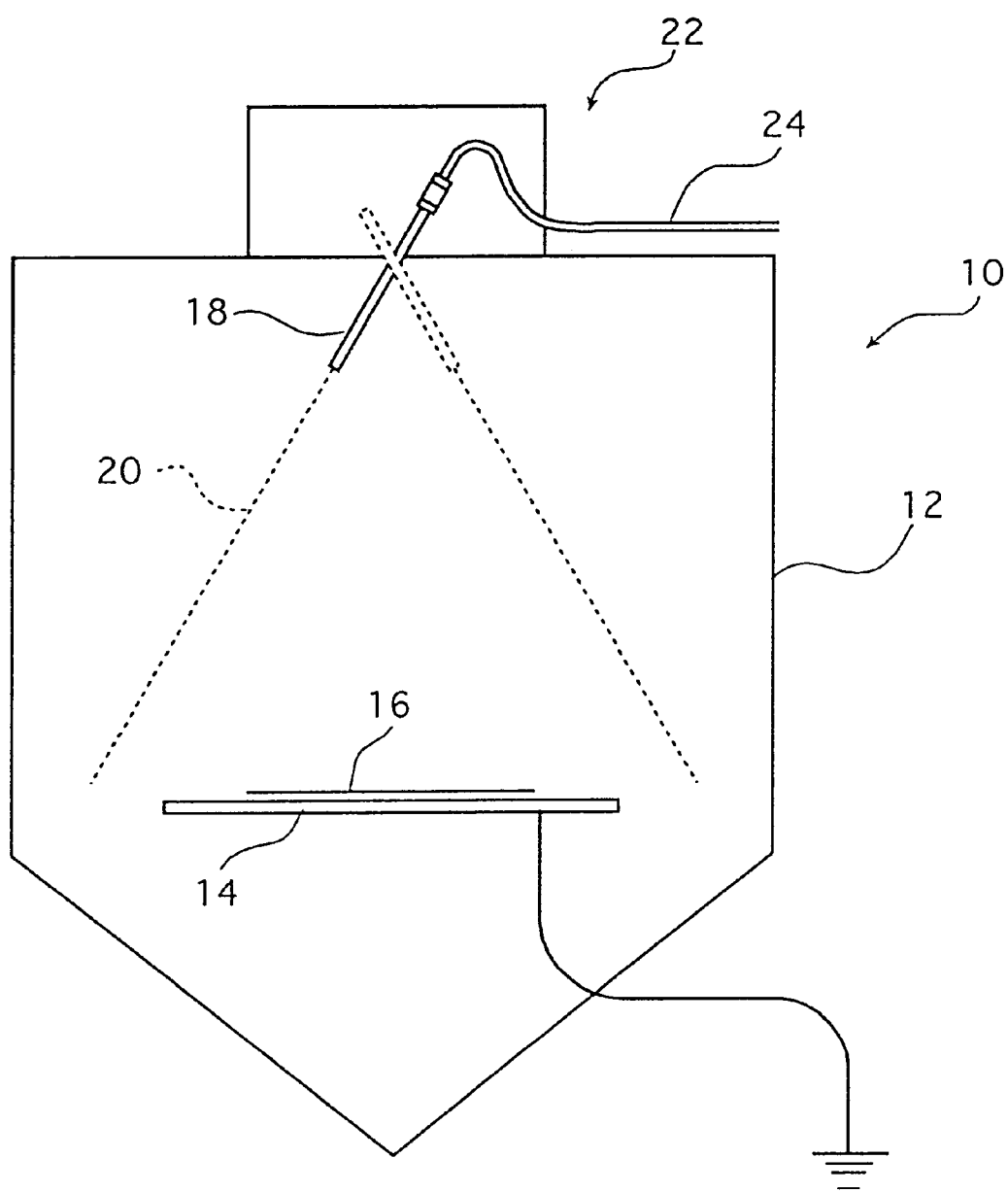
FIG. 1 is a sectional view showing an embodiment of a finely-divided powder spray apparatus of the present invention.

FIG. 1 is a sectional view showing an embodiment of the finely-divided powder spray apparatus of the present invention.

In the figure, a liquid crystal spacer spray apparatus 10 as the finely-divided powder spray apparatus of the present invention has a glass substrate 16 as a member to be sprayed positioned on and fixed to a table 14 disposed to a lower portion in a hermetically-sealed chamber 12. The table 14 is grounded to thereby ground the glass substrate 16 placed on it so that liquid crystal spacers 20 as charged finely-divided powder are securely deposited on the grounded glass substrate 16.

A spray mechanism 22 having a spray nozzle pipe 18 for spraying the liquid crystal spacers 20 is disposed above the table 14. The spray nozzle pipe 18 discharges the liquid crystal spacers 20 transported through a flexible tube 24 together with a gas stream of air, a nitrogen gas, etc. and sprays the liquid crystal spacers 20 onto the glass substrate 16. The spray nozzle pipe 18 can be swung in any of a prescribed first direction and a second direction perpendicular to the first direction, for example, any of an X-axis direction and a Y-axis direction. The liquid crystal spacers 20 are sprayed to a prescribed position on the glass substrate 16 by the spray nozzle pipe which discharges them together with the gas stream while inclining in a prescribed direction.

Figure 2:
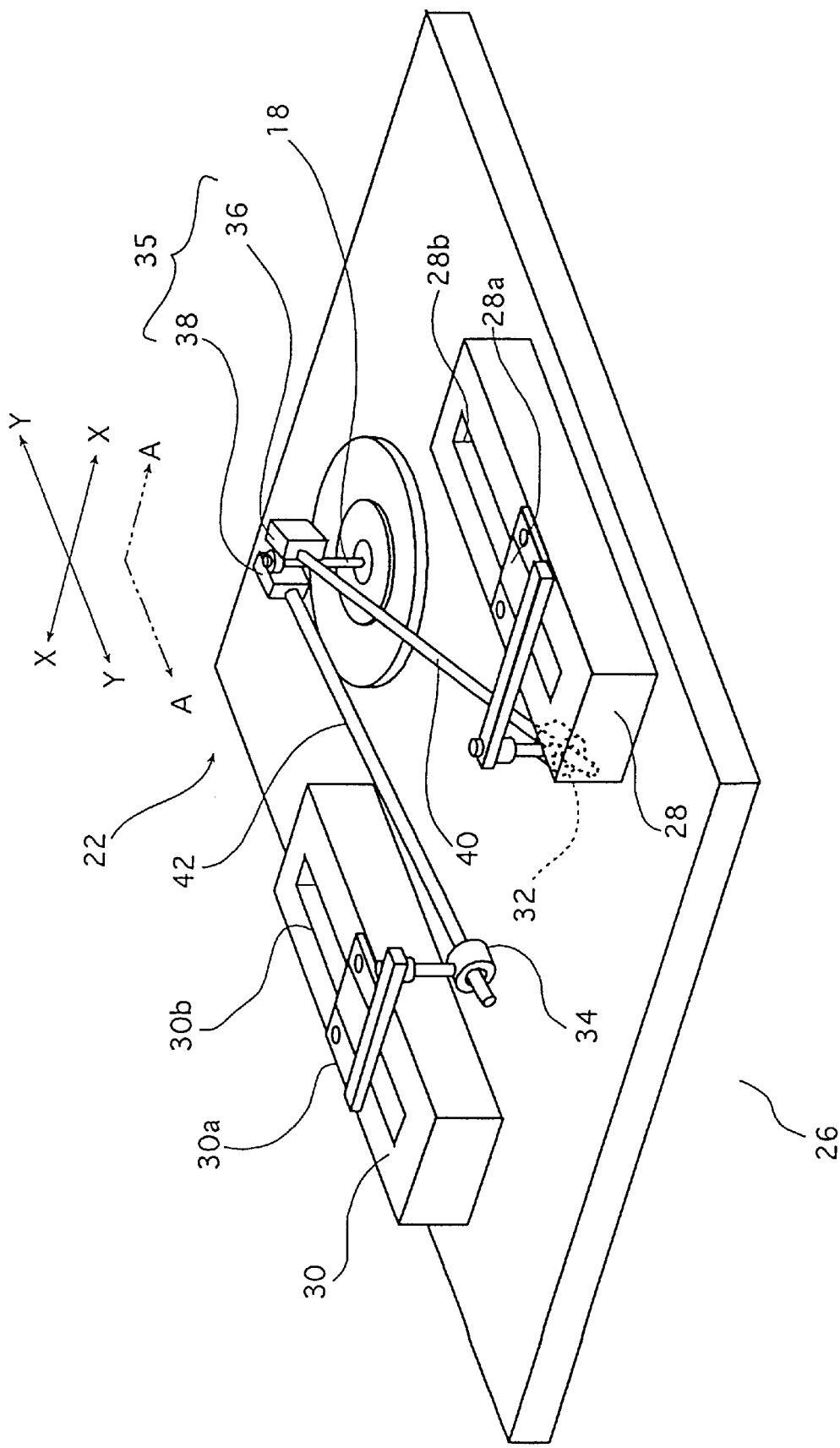
FIG. 2 is a schematic perspective view of a finely-divided powder spray mechanism used to the finely-divided powder spray apparatus shown in FIG. 1.

FIG. 2 is a perspective view schematically showing an embodiment of the spray mechanism 22 of the liquid crystal spacers 20 in the liquid crystal spacer spray apparatus 10 of the present invention.

In the figure, the spray mechanism 22 is arranged such that two linearly-moving actuators 28 and 30 are disposed on a mounting table 26 side by side in parallel with the Y-axis direction. Second joint units 32 and 34 composed of adjustable joints (spherical joints in the embodiment) are disposed on the inner sides of the linearly-moving actuators 28 and 30, respectively. The spray nozzle pipe 18 is disposed at an inner part of the two linearly-moving actuators 28 and 30 along the center line therebetween so that the spray nozzle pipe 18 can be swung in any of the X-axis direction and the Y-axis direction and inclined in an arbitrary direction. The linearly-moving actuators 28 and 30 have sliders 28a and 30a, and guides 28b and 30b which are disposed in parallel with the Y-axis direction, respectively. The sliders 28a and 30a reciprocate in the Y-axis direction along the guides 28b and 30b, respectively. The linearly-moving actuators used in the present invention are not particularly limited and an AC-servo-driven linear actuator, a linear stepping motor and the like can be used.

A first joint unit 35 is disposed to the upper end of the spray nozzle pipe 18. In the embodiment, adjustable joints (universal joints in the embodiment) 36 and 38 which project to both the sides in the X-axis direction are employed as the first joint unit 35. However, various types of joints can be employed as described below. The second joint units (adjustable joints) 32 and 34 which are disposed on the inner sides of the linearly-moving actuators 28 and 30 are coupled with the adjustable joints 36 and 38 of the first joint unit 35 disposed to the upper end of the spray nozzle pipe 18 through two rods 40 and 42, respectively.

Figure 3:
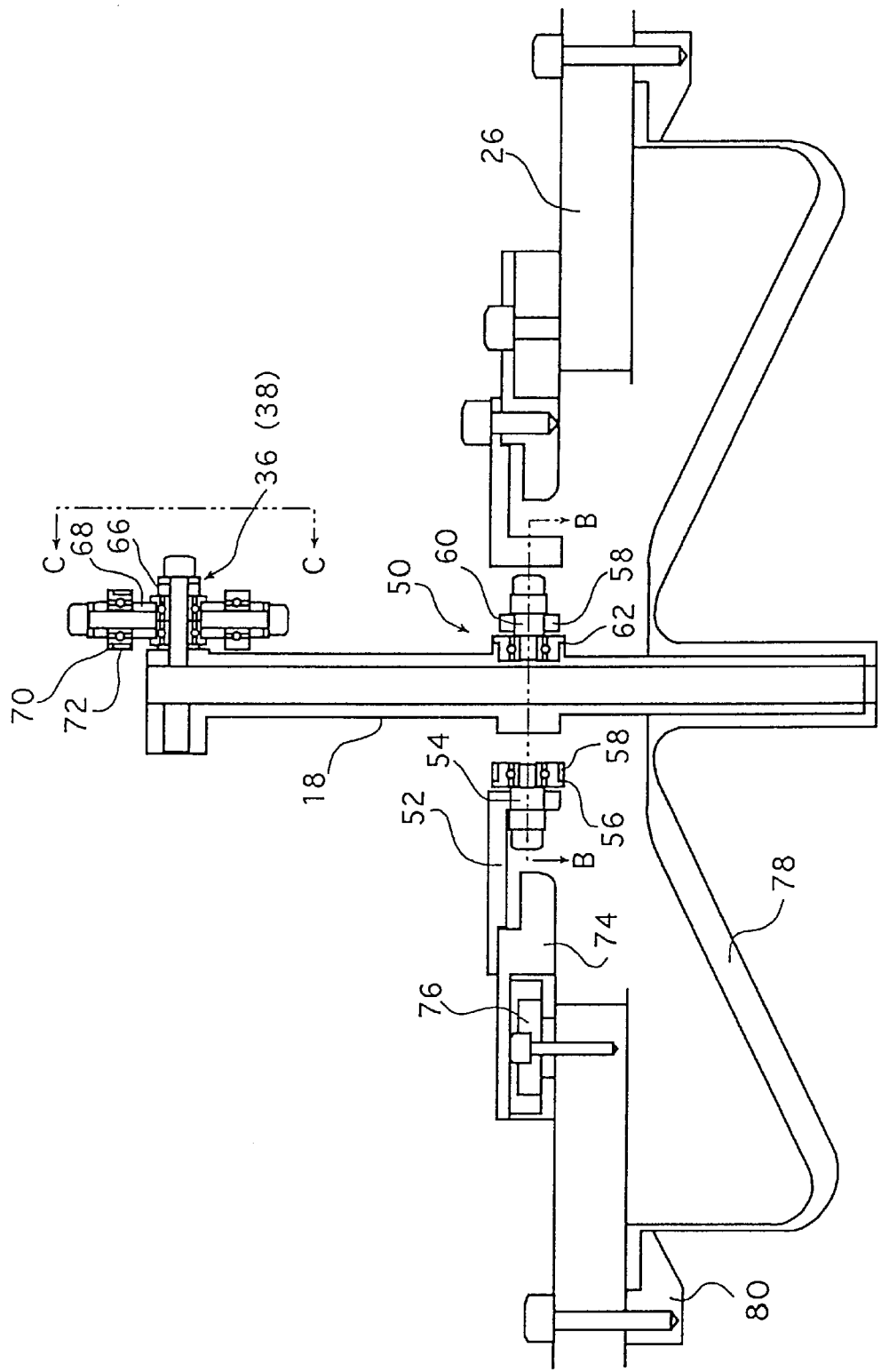
FIG. 3 is a sectional view taken along the line A—A of FIG. 2 to show in detail a first embodiment of a swing mechanism for swinging a spray nozzle pipe used to the finely-divided powder spray mechanism shown in FIG. 2.
Figure 4:
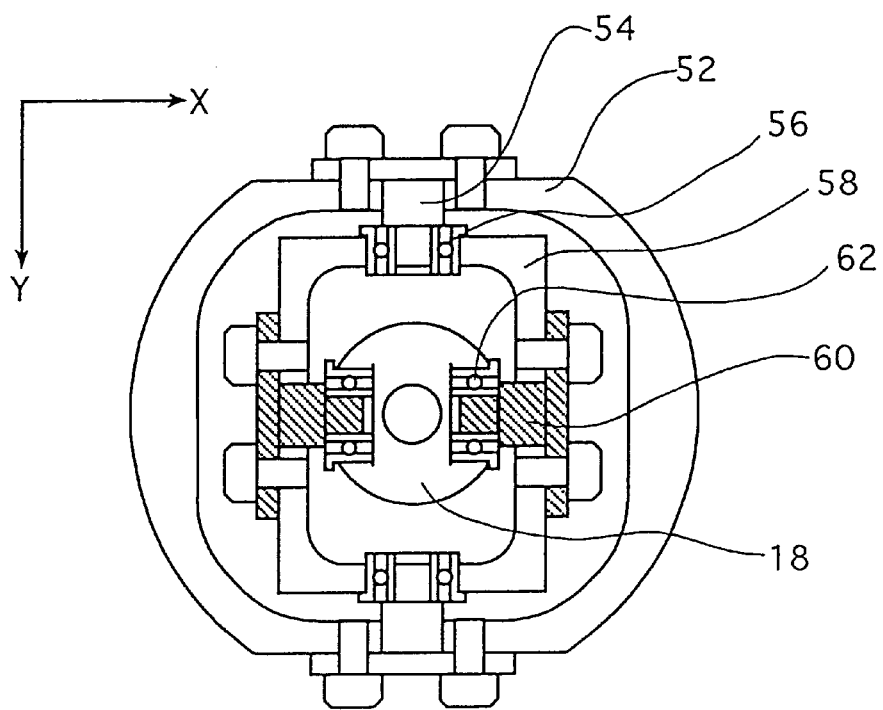
FIG. 4 is a view in the direction of the line B—B in FIG. 3 to show the swing mechanism shown in FIG. 3.
Figure 5:
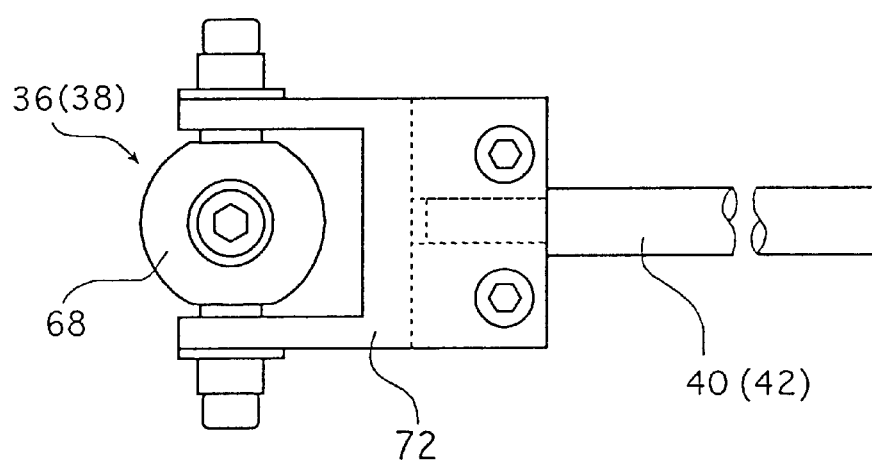
FIG. 5 is a view in the direction of the line C—C in FIG. 3 to show the swing mechanism shown in FIG. 3.

FIG. 3 is a sectional view taken along the line A—A of FIG. 2 to show in detail a first embodiment of a swing mechanism for swinging the spray nozzle pipe 18, FIG. 4 is a view in the direction of the line B—B of FIG. 3 to show the swing mechanism, and FIG. 5 is a view in the direction of the line C—C of FIG. 3 to show the swing mechanism.

The spray nozzle pipe 18 disposed at the center in FIG. 3 shows the detail of the spray nozzle pipe 18 shown in FIG. 1. The spray nozzle pipe 18 is composed of a hollow pipe and has the flexible tube 24 (not shown in FIG. 3) shown in FIG. 1 which is connected to the upper end thereof and discharges the finely-divided powder (liquid crystal spacers) 20 (not shown) from an opening at the lower end thereof together with the gas stream. The spray nozzle pipe 18 is mounted on the mounting table 26 through a support unit (universal joint unit) 50 disposed to a position in the vicinity of the center of the spray nozzle pipe 18 in the longitudinal direction thereof. The spray nozzle pipe 18 can be swung in any of the X-axis direction and the Y-axis direction shown in FIG. 2.

As shown in FIG. 3 and FIG. 4, the support unit 50 of the spray nozzle pipe 18 is composed of two support pins 54 disposed in parallel with a Y-axis, two support pins 60 disposed in parallel with an X-axis, and the spray nozzle pipe 18. A joint ring 58 is disposed in the hole of a joint base 52, which is fixed to the mounting table 26, at the center thereof and supported through the support pins 54 and ball bearings 56 into which the support pins 54 are inserted, respectively so that the joint ring 58 can rotate about the Y-axis as the center of rotation thereof. The two support pins 60 are disposed in the hole of the joint ring 58 at the center thereof in parallel with the X-axis. The spray nozzle pipe 18 is supported through the two support pins 60 and ball bearings 62 into which the two support pins 60 are supported, respectively so that the spray nozzle pipe 18 can be rotated about the X-axis as a center of rotation. Accordingly, the spray nozzle pipe 18 can be swing in any of the X-axis direction and the Y-axis direction as well as cannot be rotated about the center line thereof.

Disposed to the upper end of the spray nozzle pipe 18 are the adjustable joints 36 and 38 of the first joint unit 35 which couples the spray nozzle pipe 18 with the second joint units 32 and 34 disposed on the inner sides of the linearly-moving actuator 28 and 30 shown in FIG. 2 through the rods 40 and 42. As shown in FIG. 3 and FIG. 5, the adjustable joints (universal joints) 36 and 38 are disposed to the upper end of the spray nozzle pipe 18 so as to project to both the sides of the upper end in the X-axis direction. The adjustable joints 36 and 38 are composed of two rotary rings 68 mounted on the upper end of the spray nozzle pipe 18 through ball bearings 66 so as to rotate in a horizontal direction and a joint arm 72 connected to the rotary rings 68 through ball bearings 70. When it is not necessary to so much increase the inclining angle of the spray nozzle pipe 18 in the embodiment, spherical joints using spherical bearings may be employed in place of the universal joints as the adjustable joints 36 and 38 of the first joint unit 35.

The rod 40 (42) is fixed to the joint arm 72 and coupled with the second joint unit 32 (34) of the linearly-moving actuator 28 (30) through the rod 40 (42) so that the movement of the linearly-moving actuator 28 (30) is transmitted to the spray nozzle pipe 18.

The adjustable joints of the second joint units 32 and 34 of the linearly-moving actuators 28 and 30 may be composed of adjustable joints similar to the adjustable joints 36 and 38, or any arbitrary adjustable joints such as spherical joints and the like may be employed.

The joint base 52 is fixed to the mounting table 26 through a mounting ring 74. The mounting ring 74 has an adjusting mechanism 76 for adjusting the position of the spray nozzle pipe 18.

The lower end of the spray nozzle pipe 18 is inserted into a rubber cover 78 for hermetically sealing the chamber 12 as well as permitting the spray nozzle pipe 18 to swing. The outer periphery of the rubber cover 78 is fixed to the mounting table 26 through a fixing ring 80.

When the spray mechanism 22 is driven, there is a possibility that dust and dirt are generated from the support unit 50 of the spray nozzle pipe 18 and the like although its amount is very slight. The rubber cover 78 is mounted to prevent the invasion of the dust and dirt other than the liquid crystal spacers into the chamber 12.

As shown in FIG. 1, the flexible tube 24 is connected to the upper end of the spray nozzle pipe 18. The liquid crystal spacers 20 are transported to the spray nozzle pipe 18 together with the gas stream such as air, a nitrogen gas, etc., and the liquid crystal spacers 20 are discharged from the lower end of the spray nozzle pipe 18 together with the gas stream and sprayed onto the glass substrate 16.

In the spray mechanism 22 arranged as described above for spraying the liquid crystal spacers 20, the spray nozzle pipe 18 is swung as described below by the movement of the linearly-moving actuator 28 (30), more specifically, by the movement of the slider 28a (30a) thereof along the guide 28b (30b).

Figure 6A:
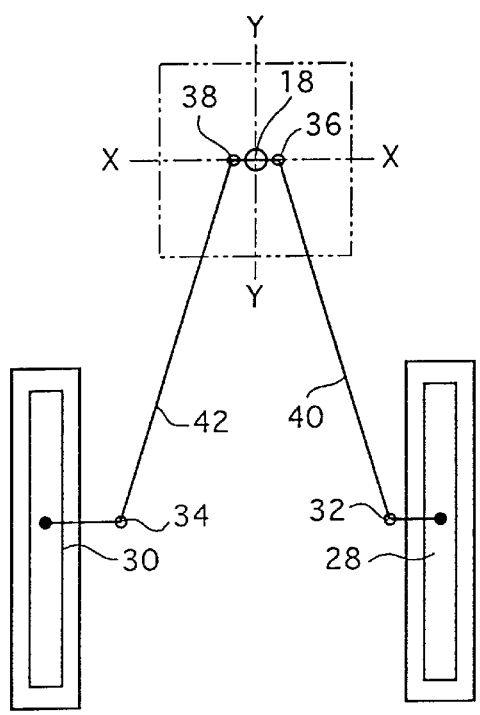
FIGS. 6A, 6B, 6C, and 6D are illustrative views explaining how the spray nozzle pipe is swung by the movements of linearly-moving actuators in the finely-divided powder spray apparatus of the present invention, respectively.
Figure 6B:
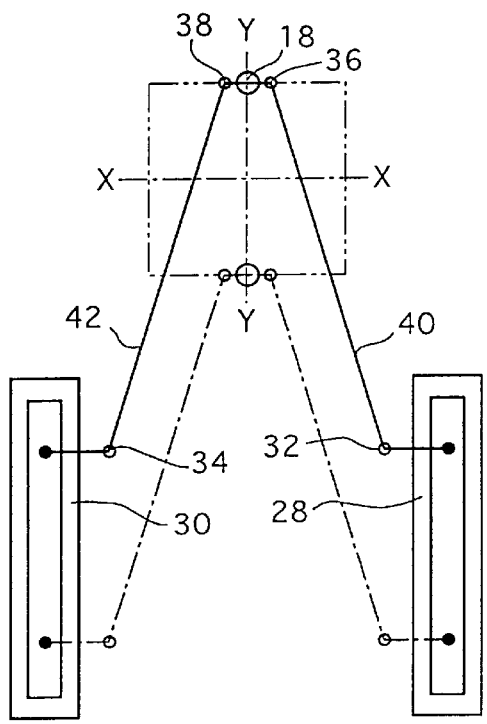
Figure 6C:
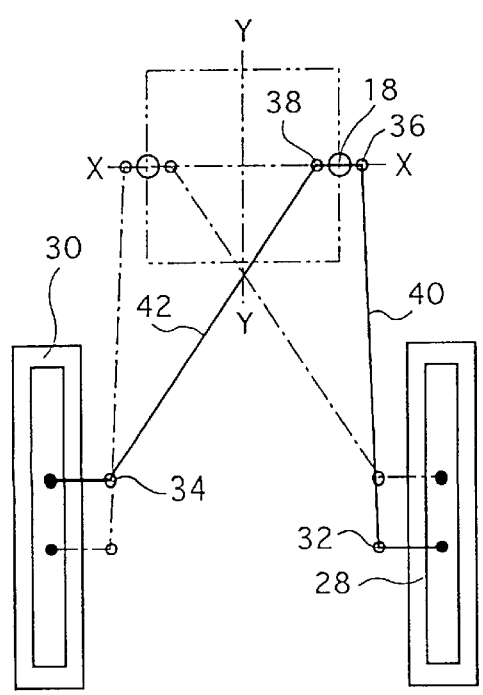
Figure 6D:
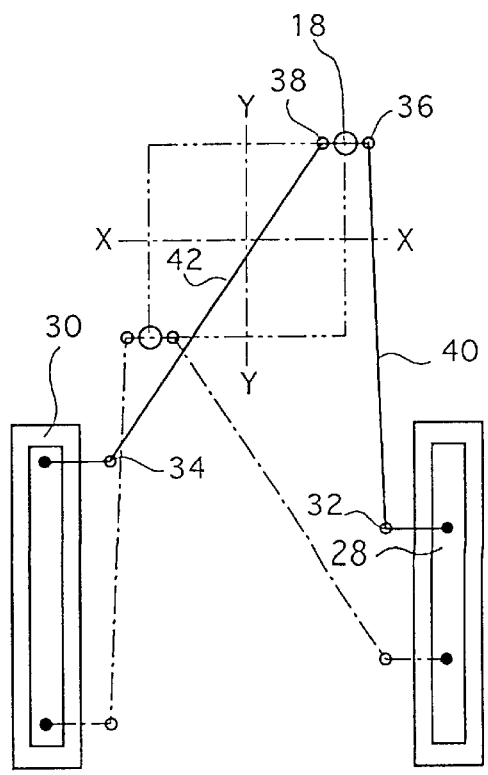

FIGS. 6A to 6D are illustrative views explaining how the spray nozzle pipe 18 is swung by the movements of the (slider 28a (30a)) of the linearly-moving actuator 28 (30), respectively, wherein FIG. 6A shows the state that the spray nozzle pipe 18 is located at a center (vertical position) in a moving area, FIG. 6B shows the positions of the linearly-moving actuators 28 and 30, more specifically, the positions of the sliders 28a and 28b of the linearly-moving actuators 28 and 30 when the spray nozzle pipe 18 is swung to a maximum moving area in the Y-axis direction, FIG. 6C shows the positions of the (sliders 28a and 30a) of the linearly-moving actuators 28 and 30 when the spray nozzle pipe 18 is swung to a maximum moving area in the X-axis direction, and FIG. 6D shows the state that the spray nozzle pipe 18 is located at a corner in the moving area.

As apparent from the comparison of FIG. 6A, FIG. 6B and FIG. 6C, when the spray nozzle pipe 18 is swung in the Y-axis direction, the two linearly-moving actuators 28 and 30 simultaneously move in the same direction, whereas when the spray nozzle pipe 18 is swung in the X-axis direction, the two linearly-moving actuators 28 and 30 simultaneously move in an opposite direction.

When the spray nozzle pipe 18 is swung to any other angle, the spray nozzle pipe 18 can be inclined to any arbitrary angle in the X-axis direction and the Y-axis direction by combining the movements of the two linearly-moving actuators 28 and 30, whereby the liquid crystal spacers 20 can be sprayed to any arbitrary position on the glass substrate 16.

As apparent from the comparison of FIG. 6B and FIG. 6C, even if the spray nozzle pipe 18 is swung the same distance, the linearly-moving actuators 28 and 30 move longer distances when the spray nozzle pipe 18 is swung in the Y-axis direction than when it is swung in the X-axis direction. This means that when the linearly-moving actuators 28 and 30 move at the same speed in both forward and rearward directions, the spray nozzle pipe 18 is swung in the X-axis direction at a speed higher than that when it is swung in the Y-axis direction.

Figure 8A:
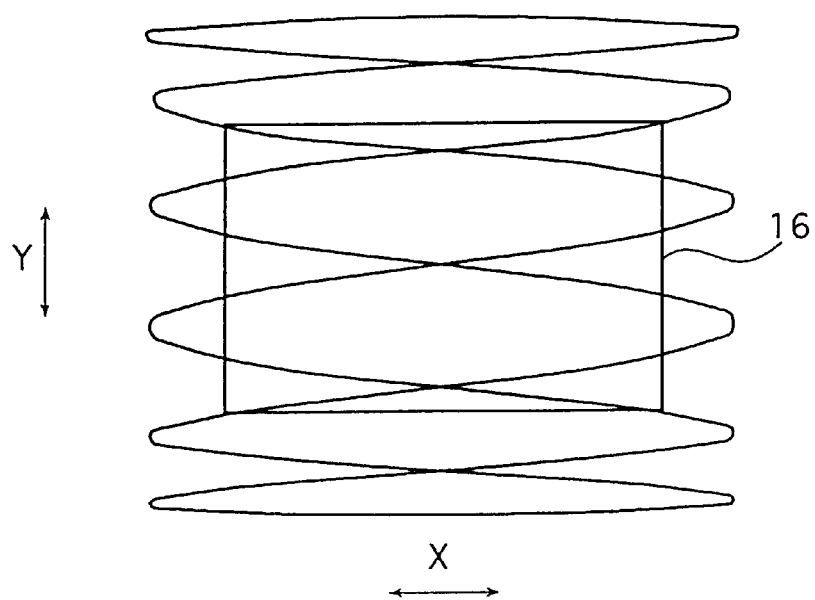
FIG. 8A is an illustrative view explaining the locus of the spray nozzle of the conventional spray apparatus and the spray nozzle of the spray apparatus of the present invention.

More specifically, when it is assumed that the spray nozzle pipe 18 reciprocates a plurality of times (6 times in the example illustrated in FIG. 8A) in the X-axis direction while it reciprocates once in the Y-axis direction likewise the prior art, the spray nozzle pipe 18 is swung at a high speed in the X-axis direction and at a low speed in the Y-axis direction. According to the present invention, since the spray nozzle pipe 18 is swung at the high speed in the X-axis direction regardless of that the linearly-moving actuators 28 and 30 have the same moving speed, the present invention is arranged more suitably also in this respect.

Although the two linearly-moving actuators 28 and 30 are disposed on both the sides of the spray nozzle pipe 18 in parallel with the Y-axis direction, the present invention is not limited to it and they may be disposed by being inclined a prescribed angle in the Y-axis direction.

Figure 7:
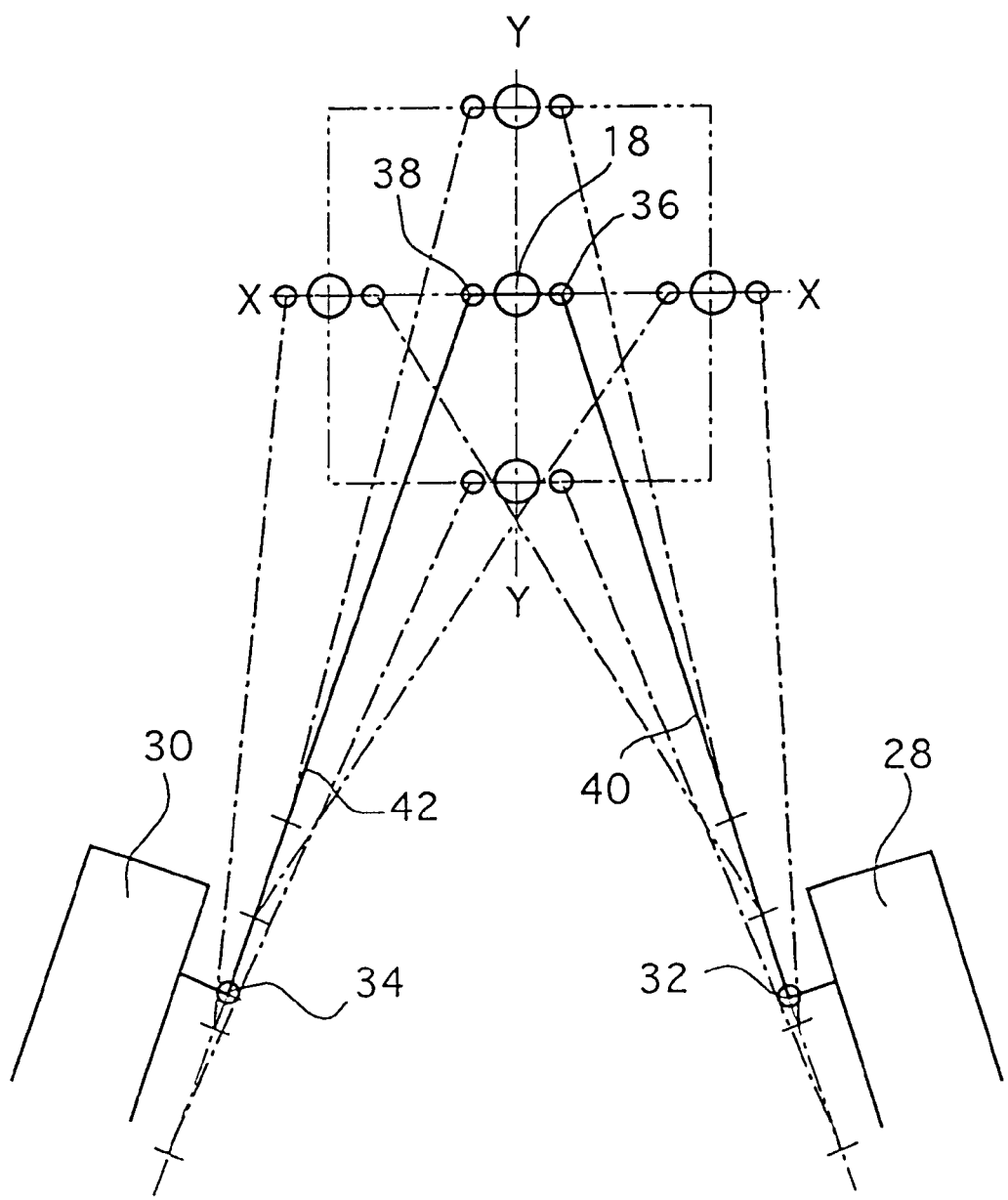
FIG. 7 is an illustrative view explaining the swing motion of the spray nozzle pipe which is swung by the movements of the linearly-moving actuators disposed at different positions in the finely-divided powder spray apparatus of the present invention.

FIG. 7 shows that the linearly-moving actuators 28 and 30 are disposed such that they move in the directions which approximately coincide with the directions where the rods 40 and 42 are coupled in stead of that they move in parallel with the Y-axis direction. As apparent from the figure, the embodiment shown in FIG. 7 is substantially the same as the embodiment shown in FIG. 6 and can be achieved likewise the embodiment shown in FIG. 6 except that the spray nozzle pipe 18 is swung such that the rods 40 and 42 are inclined prescribed angles on both the sides with respect to the moving direction of the linearly-moving actuators 28 and 30.

Since the linearly-moving actuators 28 and 30 of the present invention are driven by being numerically controlled, they can be moved independently of each other. Therefore, the spray nozzle pipe 18 can be moved in any arbitrary direction at any arbitrary speed by combining the moving directions and moving speeds of the two linearly-moving actuators 28 and 30.

Figure 8B:
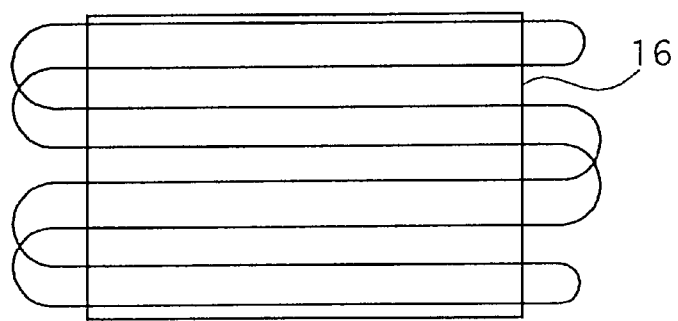
FIG. 8B is an illustrative view explaining the example of the locus of the spray nozzle of the spray apparatus of the present invention.

Since the linearly-moving actuators 28 and 30 can be moved independently of each other, the spray path and moving speed of the liquid crystal spacers 20 to be sprayed can be arbitrarily set by swinging the spray nozzle pipe 18 to an arbitrary angle. The spray path of the liquid crystal spacers 20 can be set, for example, as shown in FIG. 8B so that the liquid crystal spacers 20 can be more uniformly sprayed.

Other moving paths can be of course arbitrarily selected, and when the glass substrate 16 has a small size, the spray path of the liquid crystal spacers 20 can be set only to a narrow area so that the liquid crystal spacers 20 can be sprayed onto only the glass substrate 16.

Figure 9A:
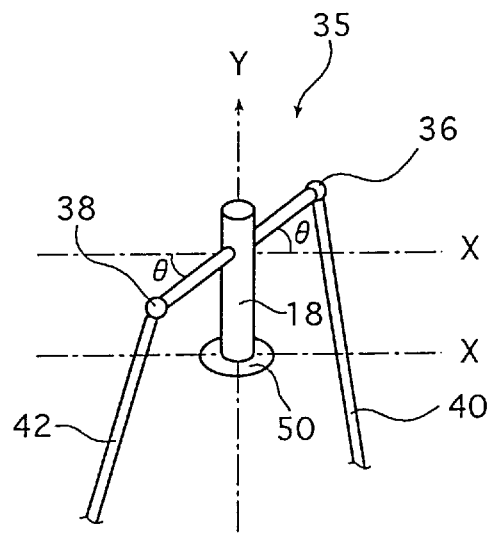
FIG. 9A, FIG. 9B, FIG. 9C, and FIG. 9D are illustrative views explaining different embodiments of the swing mechanism of the spray nozzle pipe of the finely-divided powder spray apparatus of the present invention, respectively.
Figure 9B:
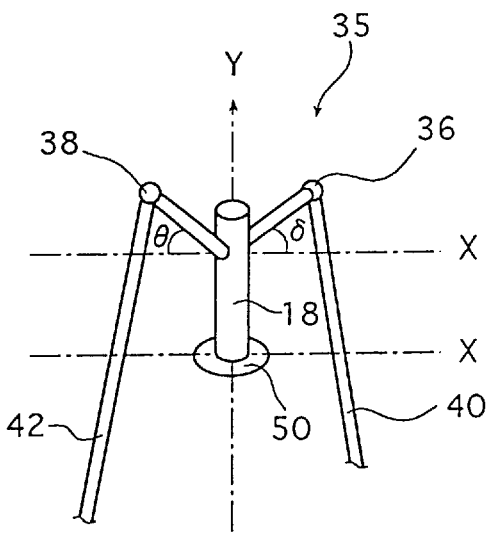
Figure 9C:
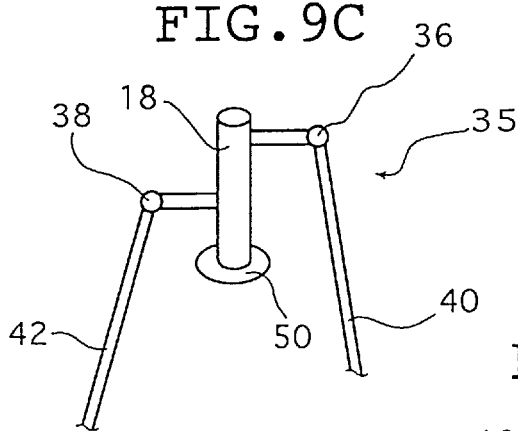

In the aforesaid example, the first joint unit 35, on which the two adjustable joints 36 and 38 are mounted, respectively to couple the two rods 40 and 42, is disposed to the ear section which project from the upper end of the spray nozzle pipe 18 to both the sides thereof in the X-axis direction. However, the present invention is not limited to the above arrangement and the adjustable joints 36 and 38 may be disposed to an ear section which projects while inclining at a prescribed angle, for example, at an angle less than 45° in place of being parallel with the X-axis direction as shown in FIG. 9A. As shown in FIG. 9B, the ear section may project at different inclining angles, for example, at an angle θ0 and an angle δ (θ≠δ) on both the sides thereof. The ear section may have different heights on both the sides thereof as shown in FIG. 9C. Further, the first joint unit 35 of the spray nozzle pipe 18 is not limited to the arrangement that it is disposed to the ear section projecting from the spray nozzle pipe 18 and it may be directly disposed to the spray nozzle pipe 18.

Figure 9D:
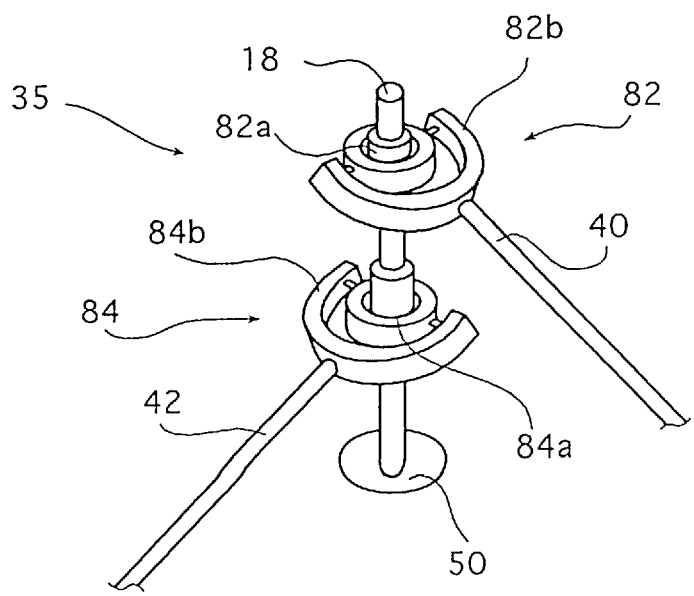

In the aforesaid example, the spray nozzle pipe 18 is disposed on the mounting table 26 so as to be swung in any of the X-axis direction and the Y-axis direction through the support unit 50 and not to be rotated. However, the present invention is not limited to the above arrangement and may be rotatably disposed. For example, the first joint unit 35 of the spray nozzle pipe 18 may be composed of two adjustable joints 82 and 84 which are rotatably mounted on the spray nozzle pipe 18 and coupled with the two rods 40 and 42 as shown in FIG. 9D. The adjustable joints 82 and 84 are composed of a support means such as bearings, for example, ball bearings 82a and 84a which are rotatably and directly mounted on the spray nozzle pipe 18 and forks 82b and 84b rotatably attached to the outsides of the ball bearings 82a and 84a through pins. Further, in this case, the support unit 50 of the spray nozzle pipe 18 may be rotated to permit the rotation of the spray nozzle pipe 18.

Figure 12A:
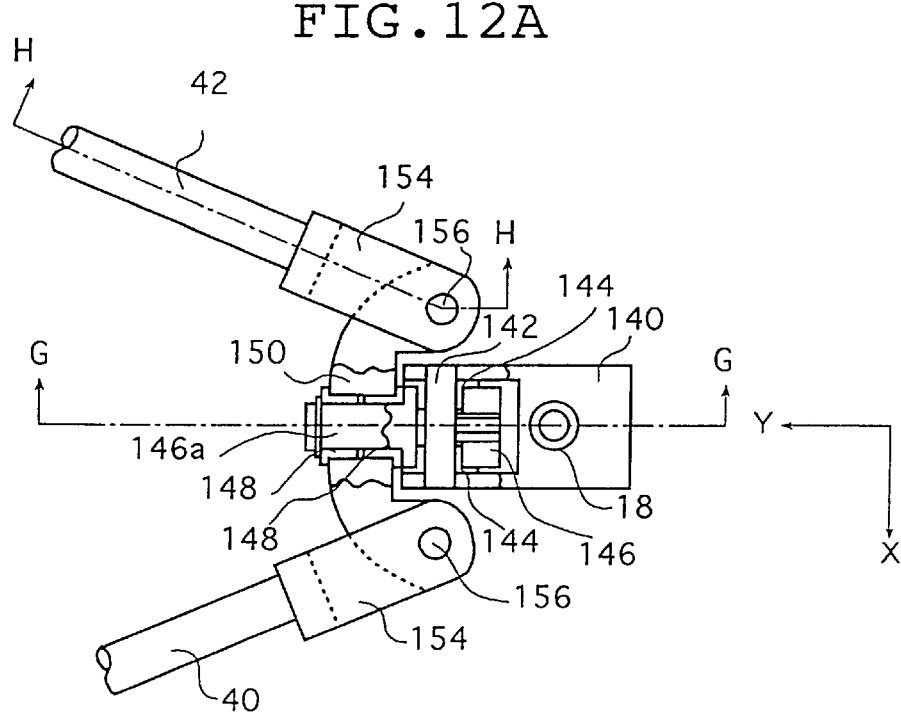
FIG. 12A is a plan view showing a fourth embodiment of the swing mechanism of the spray nozzle pipe of the finely-divided powder spray apparatus of the present invention.
Figure 12B:
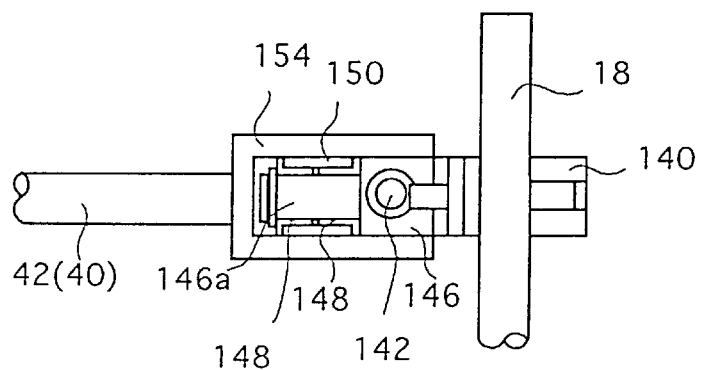
FIG. 12B is a front elevational view of the fourth embodiment of the swing mechanism partly in cross section taken along the line G—G of FIG. 12A.
Figure 12C:
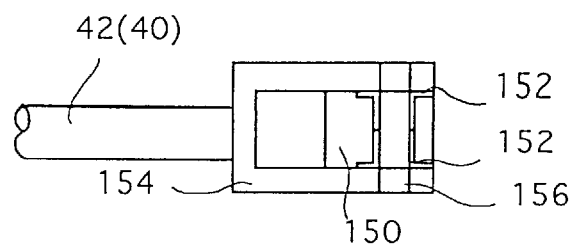
FIG. 12C is a sectional view of the fourth embodiment of the swing mechanism taken along the line H—H of FIG. 12A.

FIGS. 10A to FIG. 12C show another embodiment of the first joint unit 35 of the swing mechanism for swinging the spray nozzle pipe 18, wherein FIGS. 10A and 10B shows a second embodiment of the swing mechanism of the spray apparatus 10 of the present invention, FIGS. 11A to 11C show a third embodiment thereof, and FIGS. 12A to 12C show a fourth embodiment thereof, respectively.

FIG. 10A is a plan view partly in cross section of the second embodiment shown in FIG. 10, and FIG. 10B is a front elevational view partly in cross section taken along the line D—D in FIG. 10A.

In the second embodiment, two bolts 102, 102 which serve as the shafts of bearings 104, 104 are screwed into a fixed block 100 fixed to the upper end of a spray nozzle pipe 18 so as to project in the X-axis direction. An intermediate arm 106 is swingably disposed to the bolts 102, 102 through the bearings 104, 104. The shaft 106a of the intermediate arm 106 extends in the Y-axis direction, and an intermediate block 110 is rotatably disposed through bearings 108, 108 for journaling the shaft 106a.

Rods 40 and 42 are swingably supported by the intermediate block 110. More specifically, the rods 40 and 42 are swingably supported by bolts 120, 120 serving as center shafts which pass through bearings 116, 116 and 118, 118 disposed to C-shaped metal fittings 112 and 114 located at the extreme ends of the rods 40 and 42 approximately in parallel with the spray nozzle pipe 18 and are screwed into the intermediate block 110.

Although not shown in FIGS. 10A and 10B showing the second embodiment, a flexible tube 24 (refer to FIG. 1) is coupled with the upper end of the spray nozzle pipe 18 and the spray nozzle pipe 18 is swingably supported at the central portion thereof by a support unit 50 so as to be swung in both the X-axis direction and the Y-axis direction likewise the first embodiment.

FIG. 11A is a plan view of the third embodiment, FIG. 11B is a front elevational view partly in cross section taken along the line E—E of FIG. 11A, and FIG. 11C is a sectional view taken along the line F—F of FIG. 11A.

In the third embodiment, a pin 124 is fixed to a fixed block 122 fixed to the upper end of a spray nozzle pipe 18 so as to project in the X-axis direction, and an intermediate arm 128 is swingably disposed to the pin 124 through bearings 126, 126. The shaft 128a of the intermediate arm 128 extends in the Y-axis direction, and an intermediate block 132 is rotatably disposed to the extreme end of the shaft 128a through bearings 130, 130.

Rods 40 and 42 are swingably supported by the intermediate block 132. A pin 136 fixed to C-shaped metal fittings 134, 134 located at the extreme end of the rods 40 and 42 is journaled by a bearing 138, passes through the intermediate block 132 approximately in parallel with the spray nozzle pipe 18 and swingably supports the rods 40 and 42.

Although not shown in FIGS. 11A to 11C, a flexible tube 24 (refer to FIG. 1) is coupled with the upper end of the spray nozzle pipe 18 also in the third embodiment, and the spray nozzle pipe 18 is swingably supported at the central portion thereof by a support unit 50 so as to be swung in both the X-axis direction and the Y-axis direction likewise the first and second embodiments.

FIG. 12A is a plan view of the fourth embodiment, FIG. 12B is a front elevational view partly in cross section taken along the line G—G of FIG. 12A, and FIG. 12C is a sectional view taken along the line H—H of FIG. 12A.

In the fourth embodiment, the intermediate arm 128 of the third embodiment is shortened and the bearing 138 of the intermediate block 132 is disposed on the center line of a pin 124 so that the length of a first joint unit 35 is shortened. The pin 142 is fixed, along the X-axis direction, in the recess of a fixed block 140 fixed to the upper end of a spray nozzle pipe 18, and an intermediate arm 146 is swingably disposed to the pin 142 in the recess of the fixed block 140 through bearings 144, 144. The shaft 146a of the intermediate arm 146 extends in the Y-axis direction and an intermediate block 150 is rotatably disposed to the extreme end of the shaft 146a through bearings 148, 148.

Rods 40 and 42 are swingably supported by the intermediate block 150 which is curved to a U-shape, and bearings 152 are disposed on the center line of the pin 142. With this arrangement, there is an effect that the number of equations for calculating positions can be reduced and a time necessary to calculate loci can be shortened compared to second or third embodiment. The bearings 152 journal pins 156 fixed to C-shaped metal fittings 154, 154 disposed to the extreme ends of the rods 40 and 42 and the pins 156 pass through the intermediate block 150 approximately in parallel with the spray nozzle pipe 18 and swingably support the rods 40 and 42.

Although not shown in FIGS. 12A to 12C, a flexible tube 24 (refer to FIG. 1) is coupled with the upper end of the spray nozzle pipe 18 also in the fourth embodiment, and the spray nozzle pipe 18 is swingably supported at the central portion thereof by a support unit 50 so as to be swung in both the X-axis direction and the Y-axis direction likewise the first to third embodiments.

Figure 13A:
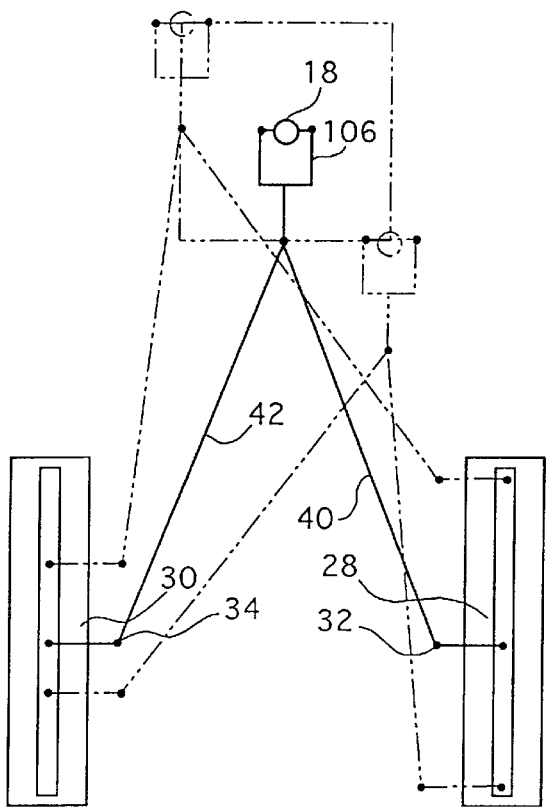
FIG. 13A, FIG. 13B and FIG. 13C are illustrative views explaining how the spray nozzle pipe is swung by the swing mechanisms of the finely-divided powder spray apparatus of the present invention shown in FIGS. 10A and 10B, FIGS. 11A to 11C and FIGS. 12A to 12C.
Figure 13B:
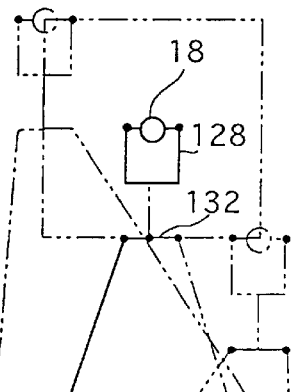
Figure 13C:
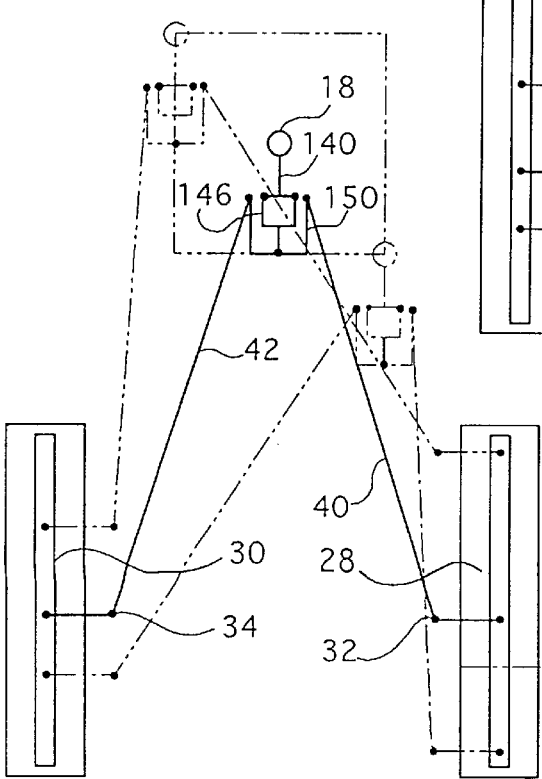

FIGS. 13A to 13C are is an illustrative view explaining how the spray nozzle pipe 18 is swung by the movements of the linearly-moving actuator 28 (30) in the second to fourth embodiments, wherein FIG. 13A shows the movement of the spray nozzle pipe 18 in the second embodiment, FIG. 13B shows the movement of the spray nozzle pipe 18 in the third embodiment, and FIG. 13C shows the movement of the spray nozzle pipe 18 in the fourth embodiment. In these figures, the states of the spray nozzle pipe 18 located at a center (vertical position) in a moving area is drawn by solid lines and the states of the spray nozzle pipe 18 located at a corner of the moving area is drawn by imaginary lines (two-dot-and-dash-lines).

As apparent from the figures, the spray nozzle pipe 18 can be swung by the same manner as the first embodiment shown in FIG. 6 also in these embodiments. Accordingly, these embodiments have the same operation/working-effect as the first embodiment.

Figure 14:
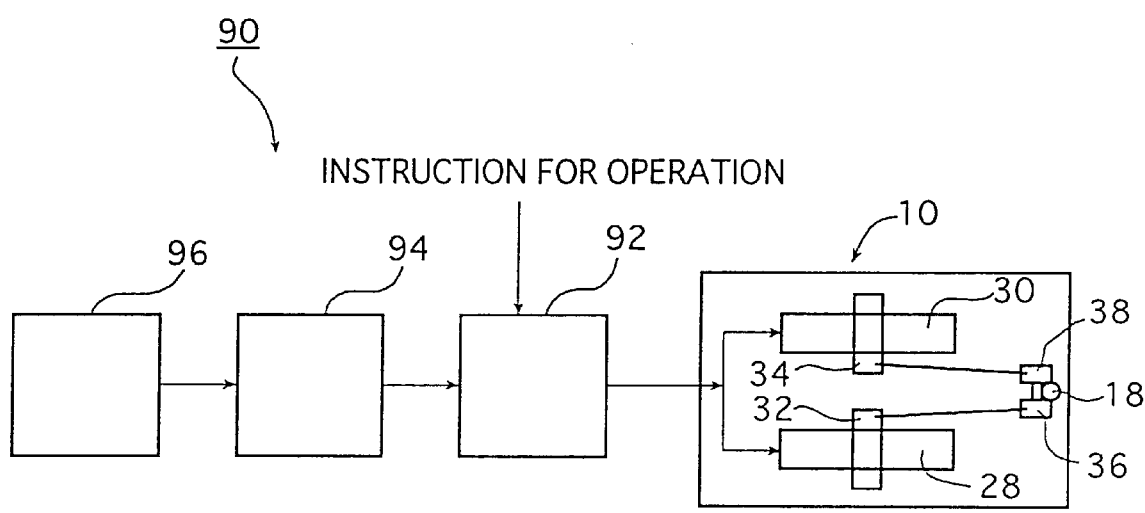
FIG. 14 is a block diagram showing an embodiment of a finely-divided powder spray system using the finely-divided powder spray apparatus of the present invention.

The operation of the aforesaid spray apparatus 10 is controlled by a system arrangement shown in FIG. 14.

As shown in the figure, a finely-divided powder spray system 90 includes the spray apparatus 10, an actuator driver 92 electrically connected to the spray apparatus 10, more specifically, to the linearly-moving actuators 28 and 30 of the spray mechanism 22 for controlling them, a sequencer 94 electrically connected to the driver 92 and a touch panel 96 electrically connected to the sequencer 94.

The actuator driver 92 supplies power to the linearly-moving actuators 28 and 30 and instructs position signals which will be described below. First, a locus which is drawn on a member to be sprayed by the line extended from the extreme end of the spray nozzle pipe 18 is determined so that the liquid crystal spacers 20 are uniformly sprayed on the member to be sprayed. The driver 92 calculates the inclining angles of the spray nozzle pipe 18 in X- and Y-directions from a locus which is desired to be drawn to the X-Y coordinate system on the member to be sprayed and further performs calculation for converting the inclining angles into the positions of the sliders 28a and 30a of the linearly-moving actuators 28 and 30.

The sequencer 94 controls the touch panel 96 as well as connects the touch panel 96 to the driver 92.

Further, instructions and operation constants necessary to operate the spray apparatus 10, in particular, to swing the spray nozzle pipe 18 are input through the touch panel 96.

The system 90 arranged as described above has two operation modes, that is, an ordinary (operation) mode and a maintenance mode and these two operation modes are switched through the touch panel 96.

Figure 15:
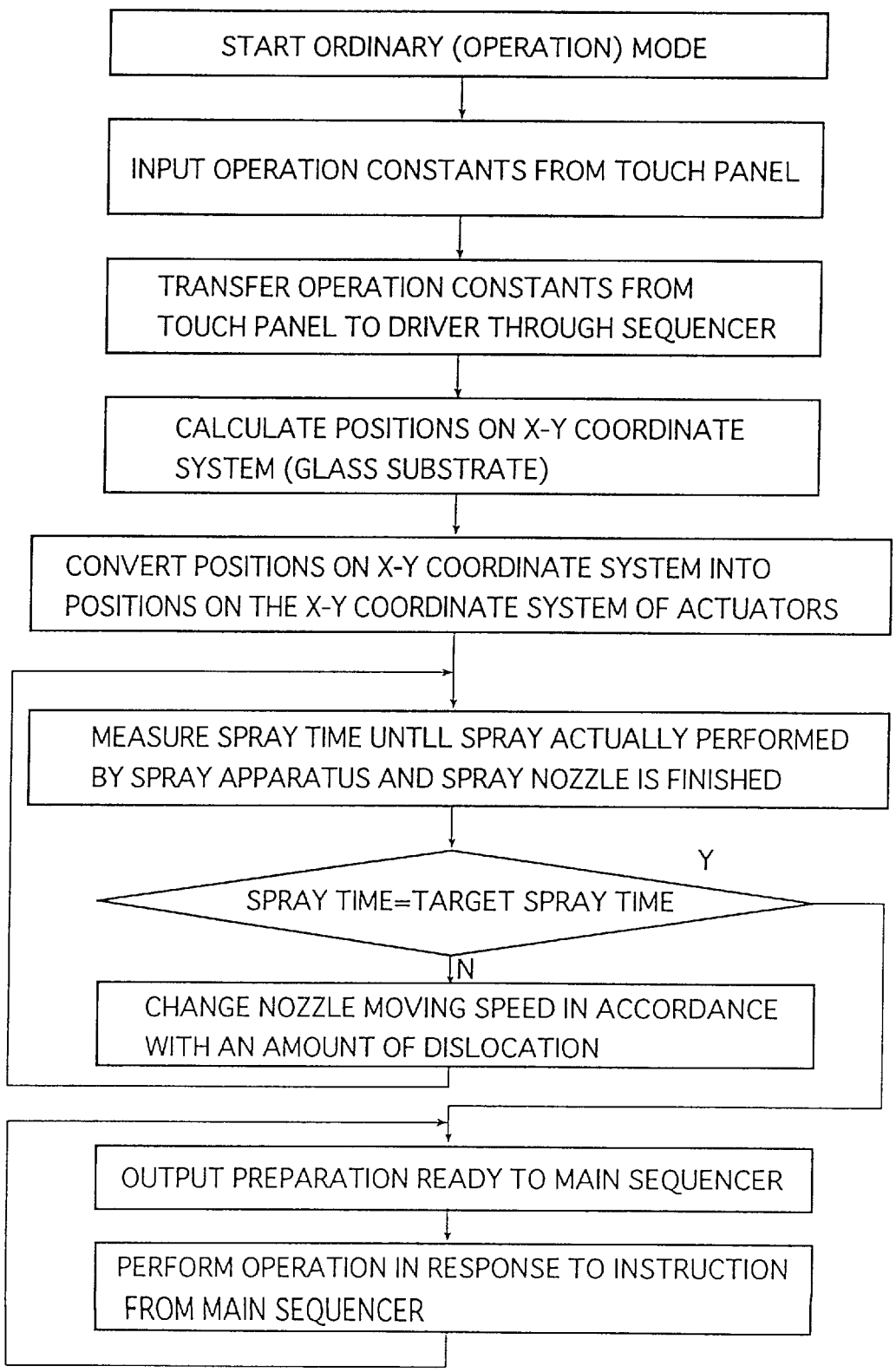
FIG. 15 is a flowchart showing an example of the operation mode of the finely-divided powder spray system shown in FIG. 14.

In the ordinary mode, first, the operation constants are input through the touch panel 96 as shown in FIG. 15. Subsequently, the input operation constants are transferred from the touch panel 96 to the driver 92 through the sequencer 94.

Next, the driver 92 calculates the position, on X-Y coordinates (on the glass substrate), where the spray nozzle pipe 18 is disposed. Subsequently, the driver 92 converts the position into the positions of the sliders 28a and 30a of the linearly-moving actuators 28 and 30 from the X-Y coordinates.

Thereafter, the driver 92 actually operates the spray apparatus 10 and swings the spray nozzle pipe 18 to thereby confirm whether a spray operation is finished within a target spray time or not.

When the spray operation time is within the target spray time (within a necessary allowable range), an operation ready completion (READY) signal is output to a main sequencer, and the spray apparatus 10 performs the spray operation to the glass substrate 16 in accordance with the instruction from the main sequencer.

If the spray operation time is not within the necessary allowable range of the target spray time, an operating speed is changed by an amount of gap (by a decelerated time or an accelerated time) and the actual operation of the spray apparatus 10 is confirmed again and this confirming operation is repeated until the spray operation is finished within the target spray time. In the example, when the spray operation is not finished within the target spray time even if the confirming operation is repeated three times, it is determined that the spray operation is erroneously performed, and the ordinary mode is finished.

Figure 16:
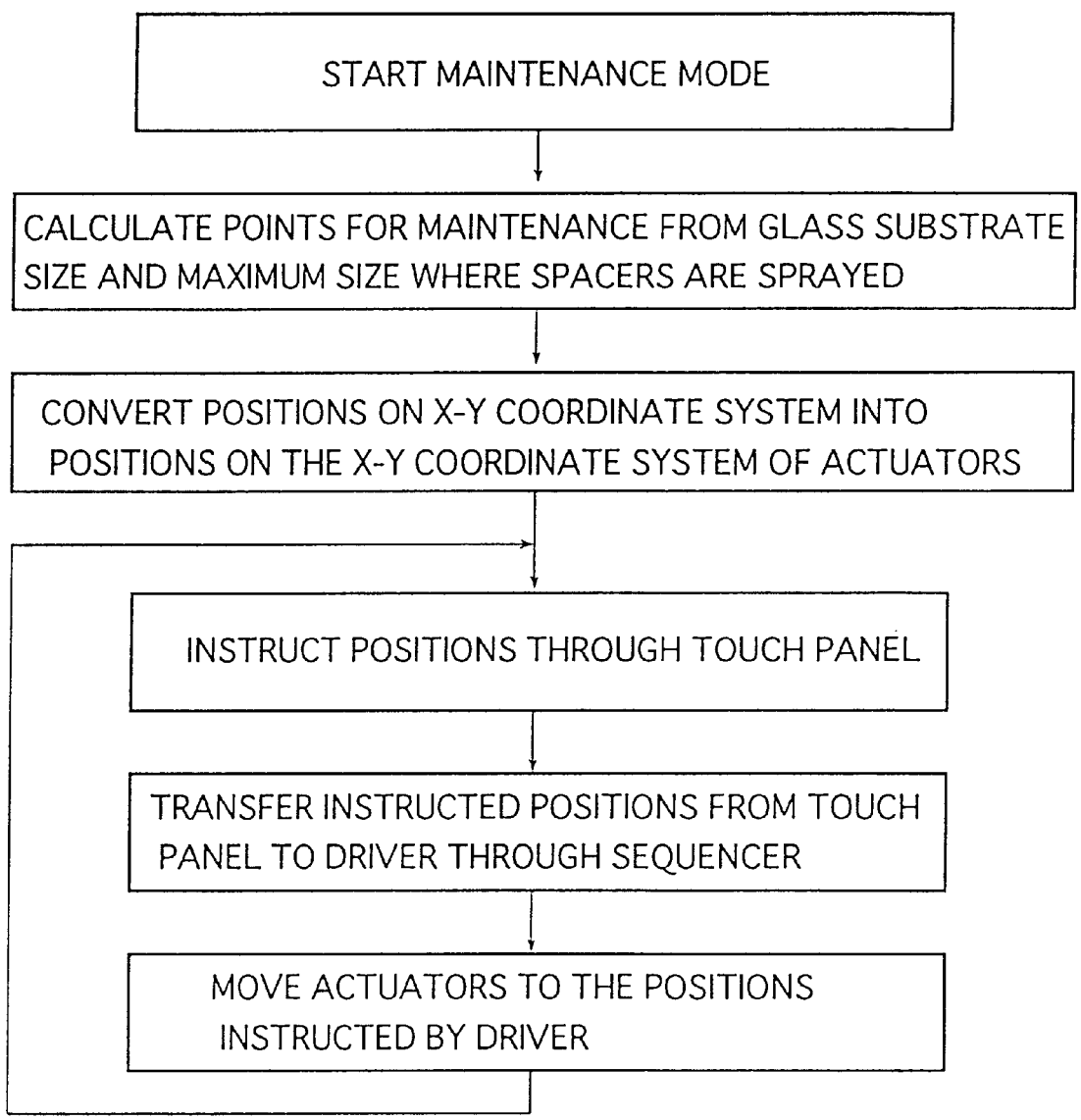
FIG. 16 is a flowchart showing another example of the operation mode of the finely-divided powder spray system shown in FIG. 14.

Next, in the maintenance mode, the driver 92 first calculates points which seem to be necessary for maintenance on the X-Y coordinates (glass substrate) based on the information such as the size of the glass substrate 16 as the member to be sprayed, the maximum size of the glass substrate 16 where the liquid crystal spacers 20 can be sprayed, and the like as shown in FIG. 16. These points are converted into the positions of the sliders 28a and 30a of the linearly-moving actuators 28 and 30 from the X-Y coordinates.

Next, the positions of these points are instructed from the touch panel 96. Subsequently, the instructed positions are transmitted from the touch panel 96 to the driver 92 through the sequencer 94. Subsequently, the driver 92 moves the sliders 28a and 30a of the linearly-moving actuators 28 and 30 to the coordinates instructed by the transferred positions.

Since the liquid crystal spacer spray apparatus and the spray system of the present invention are arranged as described above, the liquid crystal spacer spray apparatus has various functions different from those of the conventional finely-divided powder spray apparatus as described below. It is needless to say that the functions of the finely-divided powder spray apparatus of the present invention which are superior to those of the conventional finely-divided powder spray apparatus are achieved by the combination of the liquid crystal spacer spray apparatus and the spray system described above.

The liquid crystal spacers 20 may be lightly or deeply sprayed on the glass substrate 16 by a change of the size and shape of the chamber 12 which is manufactured in accordance with the specification of a customer, a slight change in the air stream in the chamber 12, a change of the distribution of an electrical potential due to metals and dielectric substances located inwardly and externally of the chamber 12, and the like.

The prior art eliminates the light and deep distribution of the liquid crystal spacers 20 by try and error by dislocating the position where the spray nozzle pipe 18 is mounted, changing the spray locus of the liquid crystal spacers 20 (changing the number of reciprocation, in the X- and Y-directions, of a Lissajous curve serving as the spraying locus), and the like. Whereas, the liquid crystal spacer spray apparatus 10 of the present invention can easily and correctly eliminate the light and deep distribution of the liquid crystal spacers 20 by increasing the moving speed of the spray nozzle pipe 18 at the portion where the liquid crystal spacers 20 are deeply sprayed and decreasing the moving speed thereof at the portion where liquid crystal spacers 20 are lightly sprayed by setting the moving speed in the spray system 90.

When the moving speed of the spray nozzle pipe 18 is changed as described above, the time necessary to spray the liquid crystal spacers 20 is changed. Further, there may be caused such a case that the liquid crystal spacers 20 are not sprayed within the target spray time by the mechanical characteristics of the liquid crystal spacer spray apparatus 10. In the case, the spray time can be compensated by increasing or decreasing the moving speed of the spray nozzle pipe 18 as a whole by changing a parameter through the touch panel 96 of the spray system 90.

The center of the position where the liquid crystal spacers 20 are sprayed can be also easily changed only through software by only moving the locus on the coordinates of the member to be sprayed in a processing program. Further, the moving locus of the spray nozzle pipe 18 can be rotated with respect to the glass substrate 16 by rotating a coordinate axis in the spray system 90 likewise.

In the liquid crystal spacer spray apparatus 10 of the present invention, the liquid crystal spacers 20 are naturally charged by that they collide against the inner surfaces of pipes such as the flexible tube 24 and the like while they are transported by air or a nitrogen gas or that they are separated to discrete particles by the breaking effect of the gas for breaking them. Accordingly, the inner wall of the chamber 12 is charged to the same polarity as that of the liquid crystal spacers 20 by the deposition of the particles of them on the inner wall.

In the prior art, the liquid crystal spacers 20 are fictitiously sprayed in the amount corresponding to 20 to 50 substrates as dummy spray to charge the inner wall of the chamber 12.

In the liquid crystal spacer spray apparatus 10 of the present invention, since the spray nozzle pipe 18 can be moved so as to spray the liquid crystal spacers 20 to any arbitrary position, the inner wall of the chamber 12 can be charged in a short time by spraying the liquid crystal spacers 20 to the inner wall.

Since the spray nozzle pipe 18 of the present invention is composed of the hollow pipe, the moving locus of the spray nozzle pipe 18 can be drawn on the glass substrate 16 on the table 14 by a laser pointer inserted into the hollow portion of the spray nozzle pipe 18. Accordingly, it can be visually confirmed whether the locus along which the liquid crystal spacers 20 are sprayed is proper or not. In particular, the center of the spray nozzle pipe 18 can be very easily positioned only by confirming that the light point of the laser pointer is located at the center of the glass substrate 16 in the state that the spray nozzle pipe 18 is disposed vertically.

In the liquid crystal spacer spray apparatus 10 of the present invention, the home positions of the actuators are confirmed by retracting the sliders 28a and 30a of the linearly-moving actuators 28 and 30 to rearmost positions. At the time, to prevent the interference between the spray nozzle pipe 18 and the joint base 52, after the linearly-moving actuator which is located far from the home position is moved first, it is confirmed that both the actuators are located side by side, and then the two actuators are moved side by side and returned to the home positions. When one of the actuators is not returned to the home position after the other actuator which is determined to be located far from the home position is returned and a prescribed time passes, since it is determined that the actuator is located at a position sufficiently near to the home position and there is no possibility of interference of the actuator, the actuator is returned to the home position.

In the example described above, the liquid crystal spacer spray apparatus is arranged such that the spray nozzle pipe is disposed above the liquid crystal glass substrate which is positioned on and fixed to the table horizontally and the liquid crystal spacers are dropped onto the glass substrate from the spray nozzle pipe being swung and uniformly sprayed thereon. However, the present invention is not limited to the above arrangement. That is, the finely-divided powder to be sprayed may be any powder so long as it must be sprayed uniformly, and, for example, powder paint, toner and the like can be exemplified in addition to the liquid crystal spacers; the member onto which the finely-divided powder is sprayed may be any member so long as it is required to spray powder onto it uniformly, and, for example, a surface onto which powder paint is coated, and the like can be exemplified in addition to the liquid crystal glass substrate; the member to be sprayed is not limited to the one disposed horizontally on the table, namely, the table may not be used, and a substrate and a surface to be coated which are disposed vertically and a substrate and a surface to be coated which are disposed obliquely can be exemplified; and further the powder may be sprayed vertically downwardly or obliquely onto a substrate or a surface to be coated which are disposed horizontally or obliquely or may be sprayed horizontally or obliquely onto a member to be sprayed which is disposed vertically or obliquely, in short, any member to be sprayed may be used so long as the finely-divided powder can be sprayed onto it by the spray nozzle pipe regardless of the position where the member is disposed and the spray direction of the powder.

While the finely-divided powder spray apparatus of the present invention has been described above in detail, the present invention is by no means limited to the above embodiments and it goes without saying that various improvements and modifications can be made within the range which does not depart from the gist of the invention.

As described above in detail, the finely-divided powder spray apparatus of the present invention employs the drive mechanism for the spray nozzle pipe which permits the swing angle of the spray nozzle pipe to be increased, the spray nozzle pipe to be moved in the X-axis direction at a high speed, a load to be uniformly applied on the drive sources for driving the spray nozzle pipes, the center of the locus of a spray path along which the finely-divided powder such as the liquid crystal spacers and the like is sprayed and the moving speed of the finely-divided powder to be changed in order to spray the finely-divided powder such as the liquid crystal spacers and the like onto a large member to be sprayed such as a larger glass substrate. Accordingly, the finely-divided powder spray apparatus of the present invention can achieve a great deal of effects that the finely-divided powder such as the liquid crystal spacers and the like can be uniformly sprayed even onto the member to be sprayed such as the larger glass substrate and the like and that the finely-divided powder such as the liquid crystal spacers and the like is not uselessly sprayed to the periphery of the member to be sprayed such as a glass substrate and the like.

Further, the height of the finely-divided powder spray apparatus of the present invention can be reduced, the size of the apparatus can be more reduced even if the size of the member to be sprayed is increased so that the height of the chamber including the spray apparatus can be suppressed and the chamber can be disposed in an existing room, for example, an existing clean room. Therefore, according to the present invention, since the height of the ceiling of the clean room and the like need not be increased by a special design, a cost is not increased.

In particular, since the spray mechanism of the present invention for spraying the finely-divided powder moves at a high speed when the spray nozzle pipe is swung in the X-axis direction, the linearly-moving actuators move a short distance and a necessary moving speed can be reduced. Further, in the finely-divided powder spray mechanism of the present invention, since the spray nozzle pipe is swung by simultaneously moving the two linearly-moving actuators, there can be achieved an effect that the load is equally shared by the two linearly-moving actuators and the durability of the actuators can be increased.

What is claimed is:

1. A finely-divided powder spray apparatus, comprising:
    a spray nozzle pipe disposed at a position spaced apart from a member to be sprayed a prescribed interval for discharging finely-divided powder from the extreme end thereof onto the member to be sprayed together with a gas stream in the state that it is inclined in a prescribed direction with respect to the member to be sprayed;
    a support unit of said spray nozzle pipe for supporting it so that it can be inclined in a prescribed first direction and a second direction perpendicular to the first direction;
    a first joint unit disposed to the upper end of said spray nozzle pipe;
    two linearly-moving actuators that each move in respective linear paths that are fixed relative to each other and each provided with a second joint unit; and
    two rods coupling each of the second joint units disposed to said two linearly-moving actuators with the first joint unit disposed to said spray nozzle pipe,
    wherein the finely-divided powder is sprayed onto the member to be sprayed from said spray nozzle pipe which is inclined in an arbitrary direction by combining the movements of said two linearly-moving actuators.

2. A finely-divided powder spray apparatus according to claim 1, wherein said support unit includes two adjustable joints which are composed of an adjustable joint for supporting said spray nozzle pipe so that it can be inclined in the first direction and an adjustable joint for supporting said spray nozzle pipe so that it can be inclined in the second direction.

3. A finely-divided powder spray apparatus according to claim 1, wherein the first joint unit of said spray nozzle pipe includes two adjustable joints which are coupled with said two rods, respectively.

4. A finely-divided powder spray apparatus according to claim 1, wherein said spray nozzle pipe is moved in the first direction by the movement of said two linearly-moving actuators in an opposite direction and moved in the second direction by the movement of said two linearly-moving actuators in the same direction.

5. A finely-divided powder spray apparatus according to claim 1, wherein said two linearly-moving actuators are numerically controlled so that they can be moved independently of each other and said spray nozzle pipe can be moved in an arbitrary direction at an arbitrary speed by combining the moving directions and the moving speeds of said two linearly-moving actuators.

6. A finely-divided powder spray apparatus according to claim 1, wherein said substrate is composed of a liquid crystal substrate and the finely-divided powder is composed of liquid crystal spacers.

7. A finely-divided powder spray apparatus including a base table on which a substrate is positioned and fixed and a spray nozzle pipe disposed to the base table at a position spaced apart from the base table a prescribed interval for discharging finely-divided powder together with a gas stream in the state that it is inclined in a prescribed direction to thereby spray the finely-divided powder to a prescribed position on the substrate, comprising:
    the spray nozzle pipe capable of being inclined in any of a first direction and a second direction perpendicular to the first direction;
    a first joint unit disposed to the upper end of said spray nozzle pipe;
    two linearly-moving actuators that each move in respective linear paths that are fixed relative to each other and each provided with a second joint unit; and
    two rods coupling the first joint unit of said spray nozzle pipe with the second joint units of said two linearly-moving actuators, respectively,
    wherein the finely-divided powder is sprayed onto the substrate by inclining said spray nozzle pipe in the first direction and the second direction by combining the movements of said two linearly-moving actuators.

8. A finely-divided powder spray apparatus according to claim 7, wherein said spray nozzle pipe is supported by two adjustable joints so that it can be inclined in the first and second directions and the two adjustable joints are composed of an adjustable joint for supporting said spray nozzle pipe so that it can be inclined in the first direction and an adjustable joint for supporting said spray nozzle pipe so that it can be inclined in the second direction.

9. A finely-divided powder spray apparatus according to claim 7, wherein the first joint unit of said spray nozzle pipe includes two adjustable joints which are coupled with said two rods, respectively.

10. A finely-divided powder spray apparatus according to claim 7, wherein said spray nozzle pipe is moved in the first direction by the movement of said two linearly-moving actuators in an opposite direction and moved in the second direction by the movement of said two linearly-moving actuators in the same direction.

11. A finely-divided powder spray apparatus according to claim 7, wherein said two linearly-moving actuators are numerically controlled so that they can be moved independently of each other and said spray nozzle pipe can be moved in an arbitrary direction at an arbitrary speed by combining the moving directions and the moving speeds of said two linearly-moving actuators.

12. A finely-divided powder spray apparatus according to claim 7, wherein said substrate is composed of a liquid crystal substrate and the finely-divided powder is composed of liquid crystal spacers.

* * * * *